(12) United States Patent
Miura et al.

(10) Patent No.: US 7,948,859 B2
(45) Date of Patent: May 24, 2011

(54) INFORMATION RECORDING MEDIUM, INFORMATION RECORDING DEVICE AND METHOD, INFORMATION REPRODUCING DEVICE AND METHOD, INFORMATION RECORDING/REPRODUCING DEVICE AND RECORDING METHOD, AND COMPUTER PROGRAM

(75) Inventors: Masahiro Miura, Saitama (JP); Eisaku Kawano, Saitama (JP); Tsuyoshi Hasebe, Saitama (JP); Masahiro Kato, Saitama (JP); Eiji Muramatsu, Saitama (JP); Shoji Taniguchi, Saitama (JP)

(73) Assignee: Pioneer Corporation, Tokyo (JP)

( * ) Notice: Subject to any disclaimer, the term of this patent is extended or adjusted under 35 U.S.C. 154(b) by 214 days.

(21) Appl. No.: 12/302,848

(22) PCT Filed: Jun. 1, 2006

(86) PCT No.: PCT/JP2006/310997
§ 371 (c)(1), (2), (4) Date: Dec. 31, 2008

(87) PCT Pub. No.: WO2007/138708
PCT Pub. Date: Jun. 12, 2007

(65) Prior Publication Data
US 2009/0316566 A1 Dec. 24, 2009

(51) Int. Cl.
*G11B 7/00* (2006.01)
(52) U.S. Cl. ............... 369/275.3; 369/275.1; 369/59.25
(58) Field of Classification Search ............ 369/275.1, 369/275.3, 59.25
See application file for complete search history.

(56) References Cited

U.S. PATENT DOCUMENTS

| 6,438,098 | B1 | 8/2002 | Nakajima et al. |
| 2001/0043515 | A1* | 11/2001 | Ueki .................. 369/30.1 |
| 2003/0048710 | A1 | 3/2003 | Yamamoto et al. |
| 2003/0063537 | A1 | 4/2003 | Yoshimura |

FOREIGN PATENT DOCUMENTS

| JP | 5-159295 | 6/1993 |
| JP | 2001-243661 | 9/2001 |
| JP | 2001-307329 | 11/2001 |
| JP | 2003-115117 | 4/2003 |
| JP | 2003-529178 | 9/2003 |

* cited by examiner

*Primary Examiner* — Wayne R Young
*Assistant Examiner* — Latanya Bibbins
(74) *Attorney, Agent, or Firm* — Young & Thompson (57) ABSTRACT

An information recording medium (100) is provided with: a first pre-recording area, in which reproducible preformed information including physical address information is recorded in advance and in which preformed address information assigned in advance is not recorded;
a second pre-recording area, which is adjacent to the first pre-recording area and in which each of the preformed address information and unreproducible preformed information is recorded in advance;
a first recording area, which is adjacent to the second pre-recording area and in which first record information is recorded and which is reproduced by an information reproducing apparatus in reproduction, the first record information including physical address information which can be reproduced by the information reproducing apparatus; and
a second recording area, which is adjacent to the first recording area and in which predetermined second record information is recorded.

12 Claims, 4 Drawing Sheets

INFORMATION RECORDING MEDIUM, INFORMATION RECORDING DEVICE AND METHOD, INFORMATION REPRODUCING DEVICE AND METHOD, INFORMATION RECORDING/REPRODUCING DEVICE AND RECORDING METHOD, AND COMPUTER PROGRAM

TECHNICAL FIELD

The present invention relates to an information recording medium, such as a DVD, an information recording apparatus and method, an information reproducing apparatus and method, an information recording/reproducing apparatus and method, such as a DVD recorder and a DVD player, and a computer program which makes a computer function as the information recording apparatus, the information reproducing apparatus, or the information recording/reproducing apparatus.

BACKGROUND ART

For example, a patent document 1 discloses a technology of forming embossed pits in advance on a recordable information recording medium, such as a DVD-R and a DVD-RW. Forming the embossed pits in advance on the recordable information recording medium leads to a reduction in the amount of data to be recorded in finalizing, resulting in a reduction in time required for the finalizing. Alternatively, by forming the embossed pits in advance on the recordable information recording medium, it is possible to prevent illegal copying of data, such as a movie.

In the patent document 1, in particular, combining a readable embossed pit which can be read (in other words, which can be reproduced) and an unreadable embossed pit which cannot be read (in other words, which cannot be reproduced) allows data recording in an area portion located immediately after an area portion with the embossed pits formed. Specifically, an information recording apparatus, such as a DVD recorder, can read land pre-pits or the like, which are formed in the area portion with the unreadable embossed pits formed, so that by obtaining address information from the land pre-pits, the data can be recorded into the area portion located immediately after the area portion with the embossed pits formed.

Patent document 1: Japanese Patent Application Laid Open NO. 2001-307329

DISCLOSURE OF INVENTION

Subject to be Solved by the Invention

However, forming the embossed pits in advance on the information recording medium newly causes the following technical problem. Specifically, the fact that the unreadable embossed pits cannot be read causes such a technical problem that, for example, an information reproducing apparatus, such as a DVD player, cannot perform the reproduction in the area portion located immediately after the area portion with the unreadable embossed pits formed. This is because the information reproducing apparatus obtains the address information, on the basis of not the land pre pits but the read information. That is, forming the embossed pits in advance on the information recording medium newly causes such a technical problem that a preferred reproduction operation is affected.

In view of the aforementioned conventional problem, it is therefore an object of the present invention to provide an information recording medium, an information recording apparatus and method, an information reproducing apparatus and method, an information recording/reproducing apparatus and method, and a computer program, which allow preferred reproduction of the record information while reducing the time required for finalizing, for example.

Means for Solving the Subject

The above object of the present invention can be achieved by an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded.

The above object of the present invention can be also achieved by an information recording apparatus for recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction, the first record information including physical address information which can be reproduced by the information reproducing apparatus; and a second recording area, which is adjacent to the first recording area and in which the predetermined second record information is recorded, the information recording apparatus provided with: a first recording device for recording the first record information including the physical address information into the first recording area, with reference to the preformed address information recorded in advance in the second pre-recording area; and a second recording device for recording the second record information into the second recording area.

The above object of the present invention can be also achieved by an information recording method of recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction, the first record information including physical address information which can be reproduced by the information reproducing apparatus; and a second recording area, which is adjacent to the first recording area and in which the predetermined second record information is recorded, the information recording method provided with: a first recording process of recording the first record information including the physical address information into the first recording area, with reference to the preformed address information recorded in advance in the second pre-recording area; and a second recording process of recording the second record information into the second recording area.

The above object of the present invention can be also achieved by an information reproducing apparatus for performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded, the information reproducing apparatus provided with: a first reproducing device for reproducing the first record information recorded in the first recording area; and a second reproducing device for reproducing the second record information recorded in the second recording area, with reference to the physical address information included in the first record information reproduced by the first reproducing device.

The above object of the present invention can be also achieved by an information reproducing method of performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded, the information reproducing method provided with: a first reproducing process of reproducing the first record information recorded in the first recording area; and a second reproducing process of reproducing the second record information recorded in the second recording area, with reference to the physical address information included in the first record information reproduced by the first reproducing device.

The above object of the present invention can be also achieved by a first computer program for controlling a computer provided for an information recording apparatus for recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction, the first record information including physical address information which can be reproduced by the information reproducing apparatus; and a second recording area, which is adjacent to the first recording area and in which the predetermined second record information is recorded, the information recording apparatus provided with: a first recording device for recording the first record information including the physical address information into the first recording area, with reference to the preformed address information recorded in advance in the second pre-recording area; and a second recording device for recording the second record information into the second recording area, the computer program making the computer function as the first recording device and the second recording device.

The above object of the present invention can be also achieved by a second computer program for controlling a computer provided for an information reproducing apparatus for performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded, the information reproducing apparatus provided with: a first reproducing device for reproducing the first record information recorded in the first recording area; and a second reproducing device for reproducing the second record information recorded in the second recording area, with reference to the physical address information included in the first record information reproduced by the first reproducing device, the computer program making the computer function as the first reproducing device and the second reproducing device.

The effects and other advantages of the present invention will become more apparent from the embodiments explained below.

DESCRIPTION OF REFERENCE CODES 100 optical disc
102 lead-in area
1021 initial zone
1022 buffer zone
1023 RW physical format information zone
200 information recording/reproducing apparatus
353 signal recording/reproducing device

BEST MODE FOR CARRYING OUT THE INVENTION

Hereinafter, an explanation will be given on embodiments of the information recording medium, the information recording apparatus and method, the information reproducing apparatus and method, the information recording/reproducing apparatus and method, and the computer program of the present invention.

Embodiment of Information Recording Medium

An embodiment of the information recording medium of the present invention is an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded.

According to the embodiment of the information recording medium of the present invention, the preformed information is recorded in advance in the first pre-recording area and the second pre-recording area. In particular, in the first pre-recording area, for example, the preformed address information which is to be read by an information recording apparatus is not recorded. On the other hand, in the second pre-recording area, the preformed address information is recorded. In the embodiment, in particular, in the first recording area adjacent to the second pre-recording area, the first record information including the physical address information is recorded by the information recording apparatus, for example. The physical address information can be reproduced (i.e. read) at least by an information reproducing apparatus which performs the reproduction on the information recording medium. In the second recording area adjacent to the first recording area, the predetermined second record information is recorded by the information recording apparatus.

As described above, according to the information recording medium in the embodiment, it is provided with the first pre-recording area and the second pre-recording area in which the preformed information is recorded in advance, so that the information recording apparatus does not necessarily record all of the predetermined data, and it is possible to reduce the size of the data that needs to be recorded in finalizing. By this, it is possible to reduce a time required for the finalizing.

Moreover, for example, when accessing the first recording area, the information recording apparatus refers to the preformed address information recorded in the second pre-recording area located before the first recording area, to thereby preferably record the first record information from a head portion of the first recording area. Specifically explaining this, when accessing a desired area portion, the information recording apparatus needs to preferably detect the address information or the like before the search destination reaches the desired area portion by sequentially searching from an area portion located before the desired area portion. In view of this operation, according to the embodiment, since the second pre-recording area in which the preformed address information is recorded is disposed before the first recording area, the information recording apparatus can preferably detect the address information or the like by searching the second pre-recording area. Thus, it is possible to prevent such a disadvantage that the information recording apparatus cannot access the head portion of the first recording area. This allows the first record information to be recorded into the entire first recording area.

In addition, for example, when accessing the second recording area, the information reproducing apparatus refers to the physical address information included in the first record information recorded in the first recording area located before the second recording area, to thereby preferably reproduce the second record information from a head portion of the second recording area. Specifically explaining this, when accessing a desired area portion, the information reproducing apparatus needs to preferably detect the address information or the like before the search destination reaches the desired area portion by sequentially searching from an area portion located before the desired area portion. In particular, the information reproducing apparatus generally cannot reproduce the preformed address information which can be read by the information recording apparatus. In view of this operation, according to the embodiment, since the first recording area in which the first record information, including the physical address information which can be reproduced by the information reproducing apparatus, is recorded is disposed before the second recording area, the information reproducing apparatus can preferably detect the address information or the like by searching the first recording area. Thus, it is possible to prevent such a disadvantage that the information reproducing apparatus cannot access the head portion of the second recording area. This allows the reproduction to be performed in the entire second recording area.

As described above, by providing the first pre-recording area and the second pre-recording area, the information recording medium in the embodiment has such a significant advantage that it is possible to preferably perform the recording operation and the reproduction operation in the area portion adjacent to or close to the first pre-recording area and the second pre-recording area, while reducing the time required for the finalizing. This is an effect peculiar to the information recording medium in the embodiment, which cannot be received according to the background described above in which the embossed pit is formed merely on the information recording medium.

In one aspect of the embodiment of the information recording medium of the present invention, a groove track and a land track are formed in the first recording area and the second recording area, the first record information and the second record information are recorded on the groove track, the preformed information is recorded in advance in the first pre-recording area and the second pre-recording area, by an embossed pit formed in advance in the first pre-recording area and the second pre-recording area, and the preformed address information is recorded in advance in a position corresponding to the land track, in the second pre-recording area.

According to this aspect, in the information recording medium on which the land track and the groove track are formed, it is possible to receive the aforementioned various effects, preferably.

In another aspect of the embodiment of the information recording medium of the present invention, the preformed information and the first record information is dummy information.

According to this aspect, even if the dummy information (e.g. fixed information such as "00h information") is recorded into the first pre-recording area, the second pre-recording area, and the first recording area, it is possible to receive the aforementioned various effects, preferably.

In another aspect of the embodiment of the information recording medium of the present invention, the first recording area is a buffer area for accessing the second recording area.

According to this aspect, the information reproducing apparatus can preferably reproduce the second record information from the head portion of the second recording area, by searching the first recording area before accessing the second recording area.

In another aspect of the embodiment of the information recording medium of the present invention, the first recording area is read by the information reproducing apparatus when the second recording area is accessed.

According to this aspect, the information reproducing apparatus can preferably reproduce the second record information from the head portion of the second recording area, by searching the first recording area before accessing the second recording area.

In another aspect of the embodiment of the information recording medium of the present invention, the first pre-recording area and the second pre-recording area are an initial zone in a lead-in area, the first recording area is a buffer zone in the lead-in area, and the second recording area is a physical format information zone in the lead-in area.

According to this aspect, in the information recording medium explained later in details with reference to the drawings, it is possible to receive the aforementioned various effects, preferably.

In this aspect, the information recording medium may comply with a DVD standard.

By virtue of such construction, in the information recording medium that complies with the DVD standard, it is possible to receive the aforementioned various effects, preferably.

Embodiment of Information Recording Apparatus

An embodiment of the information recording apparatus of the present invention is an information recording apparatus for recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction, the first record information including physical address information which can be reproduced by the information reproducing apparatus; and a second recording area, which is adjacent to the first recording area and in which the predetermined second record information is recorded (i.e. the embodiment of the information recording medium of the present invention described above (including its various aspects)), the information recording apparatus provided with: a first recording device for recording the first record information including the physical address information into the first recording area, with reference to the preformed address information recorded in advance in the second pre-recording area; and a second recording device for recording the second record information into the second recording area.

According to the embodiment of the information recording apparatus of the present invention, by the operation of the first recording device, the first record information is recorded into the first recording area. In the same manner, by the operation of the second recording device, the second record information is recorded into the second recording area.

In particular, when accessing the first recording area, the first recording device refers to the preformed address information recorded in the second pre-recording area located before the first recording area, to thereby preferably record the first record information from the head portion of the first recording area.

Moreover, the first recording device records the first record information, including the physical address information which can be reproduced by the information reproducing apparatus, into the first recording area. Thus, for example, when accessing the second recording area, the information reproducing apparatus refers to the physical address information included in the first record information recorded in the first recording area located before the second recording area, to thereby preferably reproduce the second record information from the head portion of the second recording area.

In addition, since the preformed information is recorded in advance, it is possible to reduce the time required for the finalizing.

As described above, according to the information recording apparatus in the embodiment, it is possible to preferably receive the same effects as those of the information recording medium in the embodiment described above.

Embodiment of Information Recording Method

An embodiment of the information recording method of the present invention is an information recording method of recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction, the first record information including physical address information which can be reproduced by the information reproducing apparatus; and a second recording area, which is adjacent to the first recording area and in which the predetermined second record information is recorded (i.e. the embodiment of the information recording medium of the present invention described above (including its various aspects)), the information recording method provided with: a first recording process of recording the first record information including the physical address information into the first recording area, with reference to the preformed address information recorded in advance in the second pre-recording area; and a second recording process of recording the second record information into the second recording area.

According to the embodiment of the information recording method of the present invention, it is possible to receive the same various effects as those of the embodiment of the information recording apparatus of the present invention described above.

Incidentally, in response to the various aspects of the embodiment of the aforementioned information recording apparatus of the present invention, the embodiment of the information recording method of the present invention can also employ various aspects.

Embodiment of Information Reproducing Apparatus

An embodiment of the information reproducing apparatus of the present invention is an information reproducing apparatus for performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded (i.e. the embodiment of the information recording medium of the present invention described above (including its various aspects)), the information reproducing apparatus provided with: a first reproducing device for reproducing the first record information recorded in the first recording area; and a second reproducing device for reproducing the second record information recorded in the second recording area, with reference to the physical address information included in the first record information reproduced by the first reproducing device.

According to the embodiment of the information reproducing apparatus of the present invention, by the operation of the first reproducing device, the first record information recorded in the first recording area is reproduced. In the same manner, by the operation of the second reproducing device, the second record information recorded in the second recording area is reproduced.

In particular, the second reproducing device, when accessing the second recording area, refers to the physical address information included in the first record information recorded in the first recording area located before the second recording area, to thereby preferably reproduce the second record information from the head portion of the second recording area.

As described above, according to the information reproducing apparatus in the embodiment, it is possible to preferably receive the same effects as those of the information recording medium in the embodiment described above.

Embodiment of Information Reproducing Method

An embodiment of the information reproducing method of the present invention is an information reproducing method of performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded (i.e. the embodiment of the information recording medium of the present invention described above (including its various aspects)), the information reproducing method provided with: a first reproducing process of reproducing the first record information recorded in the first recording area; and a second reproducing process of reproducing the second record information recorded in the second recording area, with reference to the physical address information included in the first record information reproduced by the first reproducing device.

According to the embodiment of the information reproducing method of the present invention, it is possible to receive the same various effects as those of the embodiment of the information reproducing apparatus of the present invention described above.

Incidentally, in response to the various aspects of the embodiment of the aforementioned information reproducing apparatus of the present invention, the embodiment of the information reproducing method of the present invention can also employ various aspects.

Embodiment of Computer Program

A first embodiment of the computer program of the present invention is a computer program for controlling a computer provided for an information recording apparatus for recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction the first record information including physical address information which can be reproduced by the information reproducing apparatus; and a second recording area, which is adjacent to the first recording area and in which the predetermined second record information is recorded (i.e. the embodiment of the information recording medium of the present invention described above (including its various aspects)), the information recording apparatus provided with: a first recording device for recording the first record information including the physical address information into the first recording area, with reference to the preformed address information recorded in advance in the second pre-recording area; and a second recording device for recording the second record information into the second recording area (i.e. the embodiment of the information recording apparatus of the present invention described above (including its various aspects)), the computer program making the computer function as the first recording device and the second recording device.

According to the first embodiment of the computer program of the present invention, the embodiment of the information recording apparatus of the present invention described above can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the embodiment of the information recording apparatus of the present invention, the first embodiment of the computer program of the present invention can also employ various aspects.

A second embodiment of the computer program of the present invention is a computer program for controlling a computer provided for an information reproducing apparatus for performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded (i.e. the embodiment of the information recording medium of the present invention described above (including its various aspects)), the information reproducing apparatus provided with: a first reproducing device for reproducing the first record information recorded in the first recording area; and a second reproducing device for reproducing the second record information recorded in the second recording area, with reference to the physical address information included in the first record information reproduced by the first reproducing device (i.e. the embodiment of the information reproducing apparatus of the present invention described above (including its various aspects)), the computer program making the computer function as the first reproducing device and the second reproducing device.

According to the second embodiment of the computer programs of the present invention, the embodiment of the information reproducing apparatus of the present invention described above can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the embodiment of the information reproducing apparatus of the present invention, the second embodiment of the computer program of the present invention can also employ various aspects.

A first embodiment of a computer program product in a computer-readable medium of the present invention is a computer program product in a computer-readable medium for tangibly embodying a program of instructions executable by a computer provided for an information recording apparatus for recording first record information and second record information onto an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which the first record information is recorded and which is reproduced by an information reproducing apparatus in reproduction, the first record information including physical address information which can be reproduced by the information reproducing apparatus; and a second recording area, which is adjacent to the first recording area and in which the predetermined second record information is recorded (i.e. the embodiment of the information recording medium of the present invention described above (including its various aspects)), the information recording apparatus provided with: a first recording device for recording the first record information including the physical address information into the first recording area, with reference to the preformed address information recorded in advance in the second pre-recording area; and a second recording device for recording the second record information into the second recording area (i.e. the embodiment of the information recording apparatus of the present invention described above (including its various aspects)), the computer program making the computer function as the first recording device and the second recording device.

According to the first embodiment of the computer program product of the present invention, the embodiment of the information recording apparatus of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the embodiment of the information recording apparatus of the present invention described above.

Incidentally, in response to the various aspects of the embodiment of the information recording apparatus of the present invention, the first embodiment of the computer program product of the present invention can also employ various aspects.

A second embodiment of a computer program product in a computer-readable medium of the present invention is a computer program product in a computer-readable medium for tangibly embodying a program of instructions executable by a computer provided for an information reproducing apparatus for performing reproduction on an information recording medium provided with: a first pre-recording area, in which reproducible preformed information including physical address information is recorded in advance and in which preformed address information assigned in advance is not recorded; a second pre-recording area, which is adjacent to the first pre-recording area and in which each of the preformed address information and unreproducible preformed information is recorded in advance; a first recording area, which is adjacent to the second pre-recording area and in which first record information is recorded and which is reproduced by an information reproducing apparatus in reproduction, the first record information including physical address information which can be reproduced by the information reproducing apparatus; and a second recording area, which is adjacent to the first recording area and in which predetermined second record information is recorded (i.e. the embodiment of the information recording medium of the present invention described above (including its various aspects)), the information reproducing apparatus provided with: a first reproducing device for reproducing the first record information recorded in the first recording area; and a second reproducing device for reproducing the second record information recorded in the second recording area, with reference to the physical address information included in the first record information reproduced by the first reproducing device (i.e. the embodiment of the information reproducing apparatus of the present invention described above (including its various aspects)), the computer program making the computer function as the first reproducing device and the second reproducing device.

According to the second embodiment of the computer program product of the present invention, the embodiment of the information reproducing apparatus of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the embodiment of the information reproducing apparatus of the present invention described above.

Incidentally, in response to the various aspects of the embodiment of the information reproducing apparatus of the present invention, the second embodiment of the computer program product of the present invention can also employ various aspects.

These effects and other advantages of the present invention will become more apparent from the examples explained below.

As explained above, the embodiment of the information recording medium of the present invention is provided with the first pre-recording area, the second pre-recording area, the first recording area, and the second recording area. According to the embodiment of the information recording apparatus of the present invention is provided with the first recording device and the second recording device. According to the embodiment of the information recording method of the present invention is provided with the first recording process and the second recording process. According to the embodiment of the information reproducing apparatus of the present invention is provided with the first reproducing device and the second reproducing device. According to the embodiment of the information reproducing method of the present invention is provided with the first reproducing process and the second reproducing process. The first embodiment of the computer program of the present invention makes a computer function as the embodiment of the information recording apparatus of the present invention. The second embodiment of the computer program of the present invention makes a computer function as the embodiment of the information reproducing apparatus of the present invention. Therefore, it is possible to preferably reproduce the record information while reducing the time required for the finalizing.

Examples

Hereinafter, preferred examples of the present invention will be explained with reference to the drawings.

Figure 1:
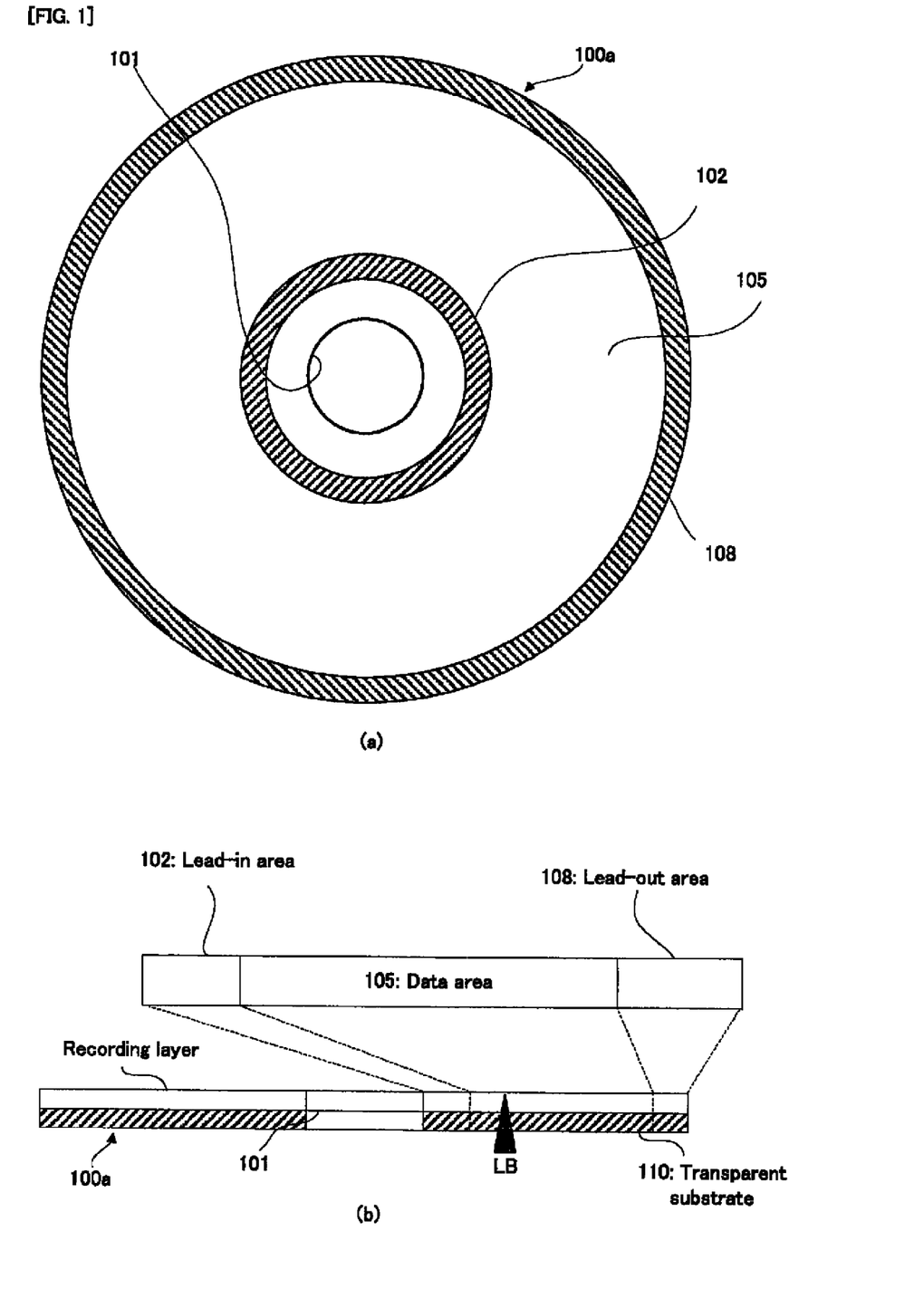
FIG. 1 are a schematic plan view showing one basic structure of an optical disc in an example, a schematic cross sectional view showing the optical disc, and a schematic conceptual view showing a recording area structure in the radial direction associated with the schematic cross sectional view.
Figure 2:
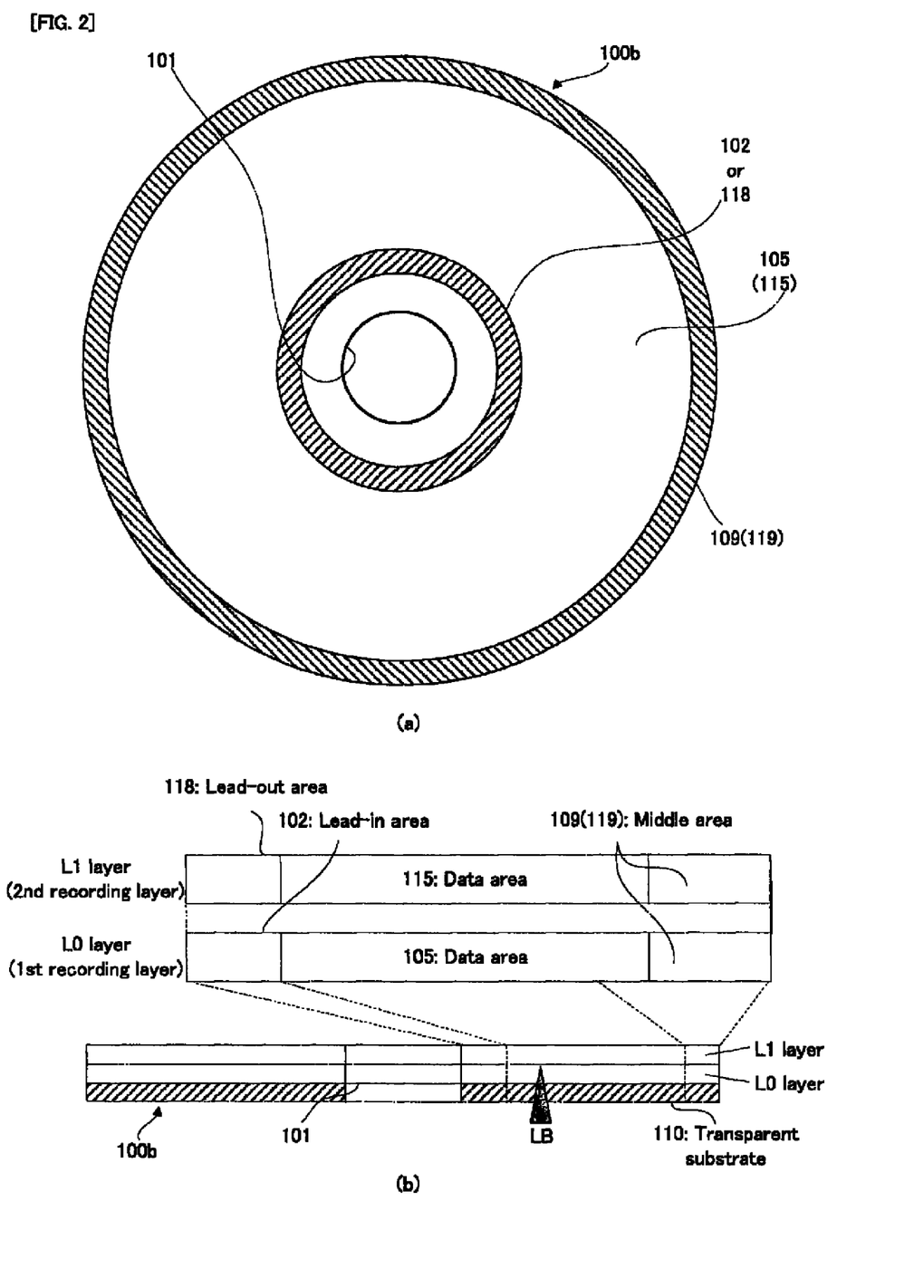
FIG. 2 are a schematic plan view showing another basic structure of the optical disc in the example, a schematic cross sectional view showing the optical disc, and a schematic conceptual view showing a recording area structure in the radial direction associated with the schematic cross sectional view.

Firstly, with reference to FIG. 1 and FIG. 2, an explanation will be given on an optical disc as an example of the information recording medium of the present invention. FIG. 1(a) is a schematic plan view showing one basic structure of the optical disc in the example, and FIG. 1(b) is a schematic cross sectional view showing the optical disc and a schematic conceptual view showing a recording area structure in the radial direction associated with the schematic cross sectional view. FIG. 2(a) is a schematic plan view showing another basic structure of the optical disc in the example, and FIG. 2(b) is a schematic cross sectional view showing the optical disc and a schematic conceptual view showing a recording area structure in the radial direction associated with the schematic cross sectional view.

As shown in FIG. 1(a) and FIG. 1(b), an optical disc 100a in the example is provided with: a center hole 101 as the center; a lead-in area 102; a data area 105; and a lead-out area 108, on a disc main body with a diameter of about 12 cm, as in a DVD, for example. Moreover, the optical disc 100a has a recording layer or the like laminated on a transparent substrate 110. Moreover, in each recording area of the recording layer, for example, a track or tracks such as a groove track and a land track are alternately disposed, spirally or concentrically, around the center hole 101. Moreover, on the track, the data is divided and recorded by a unit of ECC block. The ECC block is a data management unit by which record information can be error-corrected.

Alternatively, as shown in FIG. 2(a) and FIG. 2(b), an optical disc 100b in the example is provided with: a center hole 101 as the center; a lead-in area 102 or a lead-out area 118; data areas 105 and 115; and middle areas 109 and 119, on a disc main body with a diameter of about 12 cm, as in a DVD, for example. Moreover, the optical disc 100b has a recording layer or the like laminated on a transparent substrate 110. Moreover, in each recording area of the recording layer, for example, the tracks such as a groove track and a land track are alternately disposed, spirally or concentrically, around the center hole 101. Moreover, on the track, the data is divided and recorded by the unit of ECC block. The ECC block is a data management unit by which record information can be error-corrected.

In particular, the optical disc 100b in the example, as shown in FIG. 2(b), has such a structure that two recording layers (i.e. L0 layer and L1 layer) are laminated on the transparent substrate 110, for example. In the recording/reproducing of such a dual-layer type optical disc 100, the data recording/reproduction in the L0 layer or the L1 layer is performed in accordance with which recording layer has a focus position of a laser beam LB thereon, wherein the laser beam LB is irradiated from the lower side to the upper side in FIG. 2(b). In particular, in the L0 layer, the data is recorded from the inner circumferential side to the outer circumferential side. On the other hand, in the L1 layer, the data is recorded from the outer circumferential side to the inner circumferential side. That is, the optical disc 100b in the example corresponds to an optical disc of an opposite track path type. However, even an optical disc of a parallel track path type can receive the following various effects by adopting a structure explained below.

Incidentally, in the example, the optical disc 100a having the single recording layer and the optical disc 100b having the two recording layers will be explained as specific examples. In the following explanation, the optical discs 100a and 100b are simply referred to as an optical disc 100. However, it will be understood that the structure explained below can be applied to a multilayer type optical disc having three or more recording layers.

Figure 3:
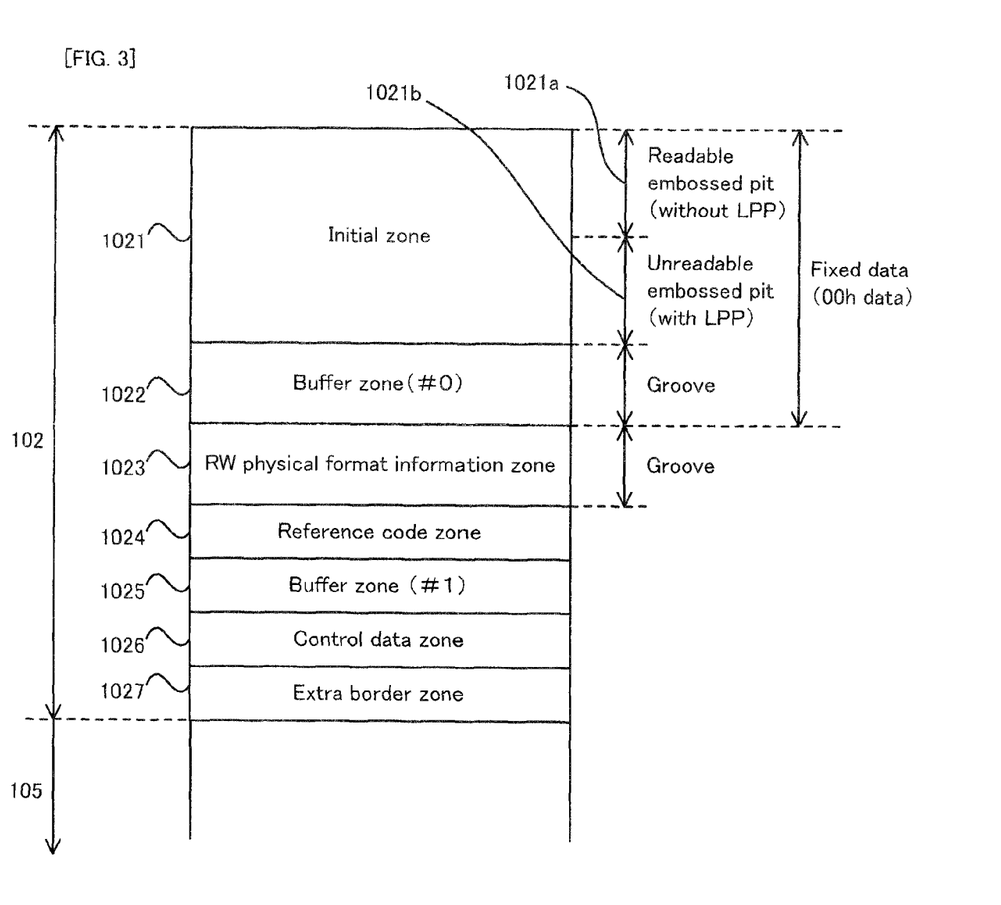
FIG. 3 is an area structure diagram conceptually showing a structure in a lead-in area of the optical disc in the example.

Next, with reference to FIG. 3, the detailed structure of the optical disc 100 in the example will be explained. FIG. 3 is an area structure diagram conceptually showing a structure in a lead-in area 102 of the optical disc 100 in the example.

Incidentally, hereinafter, an explanation will be given on the structure when the present invention is applied to the optical disc 100 in the case where the optical disc 100 complies with the DVD standard. However, it will be also understood that the present invention may be applied to an optical disc having a similar structure to that of the optical disc which complies with the DVD standard.

As shown in FIG. 3, the lead-in area 102 is provided with: an initial zone 1021, which constitutes one specific example of the "first pre-recording area" and the "second pre-recording area" of the present invention; a buffer zone (#0) 1022, which constitutes one specific example of the "first recording area" of the present invention; a RW physical format information zone 1023, which constitutes one specific example of the "second recording area" of the present invention; a reference code zone 1024; a buffer zone (#1) 1025; a control data zone 1026; and an extra border zone 1027.

In the example, in particular, a former half portion 1021a of the initial zone 1021 has fixed dummy data (e.g. 00h data) recorded in advance by a readable embossed pit which can be read. In the former half portion 1021a of the initial zone 1021, a LPP (Land Pre Pit) which indicates a pre-format address (one specific example of the "preformed address information" in the present invention) is not formed. In other words, since the LPP is not formed in the former half portion 1021a of the initial zone 1021, there is not such a disadvantage that the embossed pit and the LPP interfere with each other. As a result, it is possible to form the readable embossed pit (one specific example of the "reproducible preformed information" in the present invention).

On the other hand, a latter half portion 1021b of the initial zone 1021 has the fixed dummy data (e.g. 00h data or the like) recorded in advance by an unreadable embossed pit which cannot be read. In the latter half portion 1021b of the initial zone 1021, the LPP (Land Pre Pit) which indicates the pre-format address is formed. In other words, since the LPP is formed in the latter half portion 1021b of the initial zone 1021, the embossed pit and the LPP interfere with each other. Thus, even if the embossed pit is formed, it becomes the unreadable embossed pit (one specific example of the "unreproducible preformed information" in the present invention).

The buffer zone (#0) 1022 has the groove track and the land track formed, and the fixed dummy data (e.g. 00h data or the like) is recorded therein by an information recording/reproducing apparatus described later. That is, the buffer zone (#0) 1022 is an area in which the fixed dummy data is recorded, but it is not an area, such as the initial zone 1021, in which the data is recorded in advance by the embossed pit and it is an area in which the data is recorded by the information recording/reproducing apparatus described later.

Incidentally, when recording the data, the information recording/reproducing apparatus described later records physical address information (one specific example of the "physical address information" in the present invention) with the data.

The RW physical format information zone 1023 has the groove track and the land track formed, and has manufacturing information and physical format information which are recorded by the information recording/reproducing apparatus described later.

Here, an explanation is given on operations when the information recording/reproducing apparatus described later records the dummy data into the buffer zone (#0) 1022. In this case, firstly, a search operation is performed from the initial zone 1021 to the buffer zone 1022. At this time, the information recording/reproducing apparatus can obtain the address information with reference to the LPP formed in the latter half portion 1021b of the initial zone 1021. Thus, at the time point that the information recording/reproducing apparatus accesses the buffer zone (#0) 1022, the information recording/reproducing apparatus has already obtained the address information, preferably. Thus, the information recording/reproducing apparatus can record the dummy data from a head portion of the buffer zone (#0) 1022. That is, it is possible to preferably prevent such a disadvantage that the dummy data cannot be recorded in the head portion of the buffer zone (#0) 1022. In the same manner, the information recording/reproducing apparatus can record various data from a head portion of the RW physical format information zone 1023 following the buffer zone (#0) 1022.

On the other hand, an explanation is given on operations when the information recording/reproducing apparatus described later reproduces the various data recorded in the RW physical format information zone 1023. In this case, firstly, the search operation is performed from the buffer zone (#0) 1022 to the RW physical format information zone 1023. At this time, the information recording/reproducing apparatus can obtain the physical address information, which is recorded with the dummy data recorded in the buffer zone 1022. Thus, at the time point that the information recording/reproducing apparatus accesses the RW physical format information zone 1023, the information recording/reproducing apparatus has already obtained the address information, preferably. Thus, the information recording/reproducing apparatus can reproduce the various data from the head portion of the RW physical format information zone 1023. That is, it is possible to preferably prevent such a disadvantage that the various data recorded in the head portion of the RW physical format information zone 1023 cannot be reproduced.

In particular, since a read-only information reproducing apparatus cannot refer to the LPP, it cannot obtain the address information unless it refers to the physical address information recorded with the data. Thus, as described above, since the optical disc 100 has such a structure that the buffer zone 1022 is disposed before the RW physical format information zone 1023, even the read-only information reproducing apparatus can reproduce the various data from the head portion of the RW physical format information zone 1023.

As described above, if an area (e.g. the buffer zone (#0) 1022) in which the information recording/reproducing apparatus needs to record the data is disposed following an area in which the embossed pit is formed (e.g. the initial zone 1021), it is possible to preferably perform the recording into the area in which the information recording/reproducing apparatus needs to record the data, by disposing such an area that the LPP is formed and that the unreadable embossed pit is formed, before the area in which the information recording/reproducing apparatus needs to record the data.

Moreover, the area in which the information recording/reproducing apparatus needs to record the data is disposed before an area (e.g. the RW physical format information zone 1023) which needs to be read by the information recording/reproducing apparatus (particularly, the read-only information reproducing apparatus). Thus, it is possible to preferably perform the recording into the area which needs to be read by the information recording/reproducing apparatus. In other words, since such an area that the data is recorded with the physical address information by the information recording/reproducing apparatus and that is for the information reproducing apparatus to obtain the address information is disposed before the area which needs to be read by the information recording/reproducing apparatus, the information recording/reproducing apparatus can preferably perform the recording into the area which needs to be read by the information recording/reproducing apparatus.

Moreover, in the initial zone 1021 in which the dummy data originally needs to be recorded in finalizing, the dummy data is recorded in advance by the embossed pit. Thus, it is possible to reduce the time required for the finalizing.

Incidentally, the size of the area with the unreadable embossed pit formed of the initial zone 1021 (i.e. the latter half portion 1021*b* of the initial zone 1021) is preferably to the extent that the pre-format address can be obtained by the information recording/reproducing apparatus. In the aforementioned example, the latter half portion 1021*b* of the initial zone 1021 has, for example, a size of 16 ECC blocks.

On the other hand, the size of the buffer zone (#0) 1022 is preferably to the extent that the physical address information can be obtained by the information recording/reproducing apparatus. In the aforementioned example, the buffer zone (#0) 1022 has, for example, a size of 32 ECC blocks.

Then, in the optical disc 100*b* having the two recording layers, a physical sector number, which indicates start physical address information in each area in the condition that the data is recorded, is 024440h in the initial zone 1021, 02E200h in the buffer zone (#0) 1022, 02E400h in the RW physical format information zone 1023, 02F000h in the reference code zone 1024, 02F020h in the buffer zone (#1) 1025, 02F200h in the control data zone 1026, and 02FE00h in the extra border zone 1027.

Moreover, in the aforementioned example, the initial zone 1021, the buffer zone (#0) 1022, and the RW physical format information zone 1023 are explained as one specific example.

However, it will be understood that the aforementioned structure may be adopted if the area in which the embossed pit is formed, the area in which the information recording/reproducing apparatus needs to record the data, and the area which needs to be read by the information recording/reproducing apparatus are arranged continuously.

Figure 4:
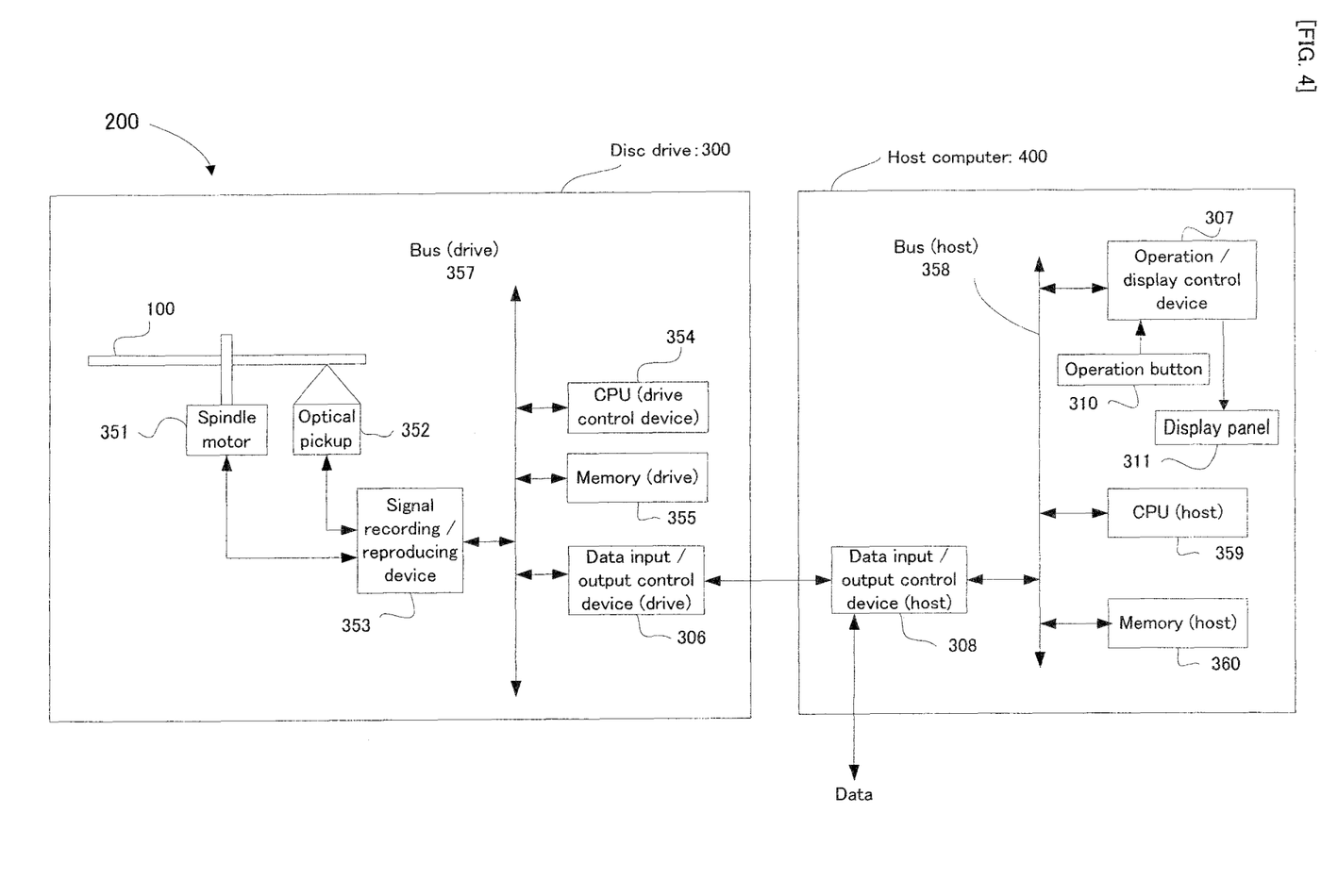
FIG. 4 is a block diagram conceptually showing the basic structure of an information recording/reproducing apparatus in an example.

Next, with reference to FIG. 4, an explanation will be given on an information recording/reproducing apparatus 200 as an example of the information recording apparatus and the information reproducing apparatus of the present invention. FIG. 4 is a block diagram conceptually showing the basic structure of the information recording/reproducing apparatus 200 in this example. Incidentally, the information recording/reproducing apparatus 200 has a function of recording data onto the optical disc 100 and a function of reproducing the data recorded on the optical disc 100. The function of recording data onto the optical disc 100 constitutes one specific example of the information recording apparatus of the present invention, and the function of reproducing the data recorded on the optical disc 100 constitutes one specific example of the information reproducing apparatus of the present invention. Thus, if the information recording/reproducing apparatus 200 is provided only with the function of recording data onto the optical disc 100, it will be understood that the information recording/reproducing apparatus 200 can be an information recording apparatus. In the same manner, if the information recording/reproducing apparatus 200 is provided only with the function of reproducing the data recorded on the optical disc 100, it will be understood that the information recording/reproducing apparatus 200 can be an information reproducing apparatus.

As show in FIG. 4, the information recording/reproducing apparatus 200 is provided with: a disc drive 300 on which the optical disc 100 is actually loaded and on which the data is recorded or reproduced; and a host computer 400, such as a personal computer, for controlling the data recording and reproduction performed on the disc drive 300.

The disc drive 300 is provided with: the optical disc 100; a spindle motor 351; an optical pickup 352; a signal recording/reproducing device 353; a CPU (drive control device) 354; a memory 355; a data recording/reproducing device 306; and a bus 357. Moreover, the host computer 400 is provided with: a CPU 359; a memory 360; an operation/display control device 307; an operation button 310; a display panel 311; a data input/output control device 308; and a bus 358.

The spindle motor 351 is intended to rotate and stop the optical disc 100, and operates in accessing the optical disc 100. More specifically, the spindle motor 351 is constructed to rotate the optical disc 100 at a predetermined speed and stop it, under spindle servo provided by a not-illustrated servo unit or the like.

The optical pickup 352 is to perform the recording/reproducing on the optical disc 100, and is provided with a semiconductor laser apparatus, a lens, and the like. More specifically, the optical pickup 352 irradiates the optical disc 100 with a light beam, such a laser beam, as reading light with a first power in the reproduction, and as writing light with a second power with it modulated in the recording.

The signal recording/reproducing device 353 constitutes one specific example of the "first recording device", the "second recording device", the first reproducing device", and the "second reproducing device" of the present invention. The signal recording/reproducing device 353 performs the recording/reproducing on the optical disc 100 by controlling the spindle motor 351 and the optical pickup 352. More specifically, the signal recording/reproducing device 353 is provided with a laser diode (LD) driver, a head amplifier, and the like. The LD driver drives the not-illustrated semiconductor laser apparatus built in the optical pickup 352. The head amplifier amplifies the output signal of the optical pickup 352, i.e., the reflected light of the light beam, and outputs the amplified signal. More specifically, the signal recording/reproducing device 353 drives the not-illustrated semiconductor laser apparatus built in the optical pickup 352, to determine an optimum laser power by a process of recording and reproducing an OPC pattern, together with a not-illustrated timing generator, under the control of the CPU 354 in an OPC process.

The memory 355 is used in the general data processing and the OPC process on the disc drive 300, including a buffer area for the record/reproduction data, an area that is used as an intermediate buffer when the data is converted to the data that can be used on the signal recording/reproducing device 353, or the like. The memory 355 is provided with: a ROM area in which a program for performing an operating as the recorder equipment, i.e., firmware is stored; a RAM area, including a buffer for temporarily storing the record/reproduction data, in which a parameter required for the operation of the firmware program or the like is stored; and the like.

The CPU (drive control device) 354 is connected to the signal recording/reproducing device 353 and the memory 355 via the bus 357, and controls the entire disc drive 300 by giving instructions to various control devices. In general, software or firmware for operating the CPU 354 is stored in the memory 355.

The data input/output control device 306 controls the data input/output from the exterior with respect to the disc drive 300, and stores the data into or extracts it from a data buffer on the memory 355. A drive control command, which is issued from the external host computer 400 connected to the disc drive 300 via an interface, such as a SCSI (Small Computer System Interface) and an ATAPI (AT Attachment Packet Interface), is transmitted to the CPU 354 through the data input/output control device 306. Moreover, the record/reproduction data is also exchanged with the host computer 400 through the data input/output control device 306.

The operation/display control device 307 performs the reception of the operation instruction and display with respect to the host computer 400. The operation/display control device 307 sends an instruction to perform the recording or reproduction, using the operation bottom 310, to the CPU 359. The CPU 359 sends a control command to the disc drive 300 through the input/output control device 308 on the basis of the instruction information from the operation/display control device 307, to thereby control the entire disc drive 300. In the same manner, the CPU 359 can send a command of requiring the disc drive 300 to send the operational state to the host, to the disc drive 300. By this, it is possible to recognize the operational state of the disc drive 300, such as during recording and during reproduction. Thus, the CPU 359 can output the operational state of the disc drive 300, to the display panel 311, such as a fluorescent tube and a LCD, through the operation/display control device 307.

The memory 360 is an inner memory apparatus used by the host computer 400. The memory 360 is provided with: a ROM area in which a firmware program, such as BIOS (Basic Input/Output System), is stored; a RAM area in which a parameter required for the operation of an operating system and an application program or the like is stored; and the like. Moreover, the memory 360 may be connected to an external memory apparatus, such as a not-illustrated hard disk, through the data input/output control device 308.

One specific example in which the disc drive 300 and the host computer 400, as explained above, are used together is household equipment, such as recorder equipment for recording/reproducing a video. The recorder equipment is equipment for recording a video signal from a broadcast reception tuner and an external connection terminal, onto a disc, and for outputting the video signal reproduced from the disc, to external display equipment, such as a television. The operation as the recorder equipment is performed by executing a program stored in the memory 360, on the CPU 359. Moreover, in another specific example, the disc drive 300 is a disc drive (hereinafter referred to as a drive, as occasion demands), and the host computer 400 is a personal computer or a workstation. The host computer 400, such as the personal computer, and the disc drive are connected to each other through the data input/output control devices 306 and 308, such as the SCSI and the ATAPI. An application, such as writing software, which is installed in the host computer 400, controls the disc drive 300.

The information recording/reproducing apparatus 200 in the example performs the recording operation and the reproduction operation on the optical disc 100 described above. Thus, it is possible to preferably receive the various effects of the optical disc 100 described above.

Moreover, in the aforementioned examples, the optical disc 100 is explained as one example of the information recording medium, and the recorder or player related to the optical disc 100 is explained as one example of the information recording/reproducing apparatus. The present invention, however, is not limited to the optical disc and the recorder or player thereof, and can be applied to other various information recording media which support high-density recording or a high transfer rate, and recorders or players thereof.

The present invention is not limited to the aforementioned embodiment, but various changes may be made, if desired, without departing from the essence or spirit of the invention which can be read from the claims and the entire specification. An information recording medium, an information recording apparatus and method, an information reproducing apparatus and method, an information recording/reproducing apparatus and method, and a computer program, all of which involve such changes, are also intended to be within the technical scope of the present invention.

The invention claimed is:

1. An information recording medium comprising:
a first pre-recording area, in which reproducible preformed information including physical address information is recorded in advance and in which preformed address information assigned in advance is not recorded;
a second pre-recording area, which is adjacent to said first pre-recording area and in which each of the preformed address information and unreproducible preformed information is recorded in advance;
a first recording area, which is adjacent to said second pre-recording area and in which first record information is recorded and which is reproduced by an information reproducing apparatus in reproduction, the first record information including physical address information which can be reproduced by said information reproducing apparatus; and
a second recording area, which is adjacent to said first recording area and in which predetermined second record information is recorded,
wherein said first pre-recording area and said second pre-recording area are an initial zone in a lead-in area,
said first recording area is a buffer zone in the lead-in area, and
said second recording area is a physical format information zone in the lead-in area.

2. The information recording medium according to claim 1, wherein
a groove track and a land track are formed in said first recording area and said second recording area,
the first record information and the second record information are recorded on the groove track,
the preformed information is recorded in advance in said first pre-recording area and said second pre-recording area, by an embossed pit formed in advance in said first pre-recording area and said second pre-recording area, and
the preformed address information is recorded in advance in a position corresponding to the land track, in said second pre-recording area.

3. The information recording medium according to claim 1, wherein the preformed information and the first record information is dummy information.

4. The information recording medium according to claim 1, wherein said first recording area is a buffer area for accessing said second recording area.

5. The information recording medium according to claim 1, wherein said first recording area is read by said information reproducing apparatus when said second recording area is accessed.

6. The information recording medium according to claim 1, wherein said information recording medium complies with a DVD standard.

7. An information recording apparatus for recording first record information and second record information onto an information recording medium comprising: a first pre-recording area, in which reproducible preformed information including physical address information is recorded in advance and in which preformed address information assigned in advance is not recorded; a second pre-recording area, which is adjacent to said first pre-recording area and in which each of the preformed address information and unreproducible preformed information is recorded in advance; a first recording area, which is adjacent to said second pre-recording area and in which the first record information is recorded and which is reproduced by an information reproducing apparatus in reproduction, the first record information including physical address information which can be reproduced by said information reproducing apparatus; and a second recording area, which is adjacent to said first recording area and in which the predetermined second record information is recorded,
said information recording apparatus comprising:
a first recording device for recording the first record information including the physical address information into said first recording area, with reference to the preformed address information recorded in advance in said second pre-recording area; and
a second recording device for recording the second record information into said second recording area.

8. An information recording method of recording first record information and second record information onto an information recording medium comprising: a first pre-recording area, in which reproducible preformed information including physical address information is recorded in advance and in which preformed address information assigned in advance is not recorded; a second pre-recording area, which is adjacent to said first pre-recording area and in which each of the preformed address information and unreproducible preformed information is recorded in advance; a first recording area, which is adjacent to said second pre-recording area and in which the first record information is recorded and which is reproduced by an information reproducing apparatus in reproduction, the first record information including physical address information which can be reproduced by said information reproducing apparatus; and a second recording area, which is adjacent to said first recording area and in which the predetermined second record information is recorded,
said information recording method comprising:
a first recording process of recording the first record information including the physical address information into said first recording area, with reference to the preformed address information recorded in advance in said second pre-recording area; and
a second recording process of recording the second record information into said second recording area.

9. An information reproducing apparatus for performing reproduction on an information recording medium comprising: a first pre-recording area, in which reproducible preformed information including physical address information is recorded in advance and in which preformed address information assigned in advance is not recorded; a second pre-recording area, which is adjacent to said first pre-recording area and in which each of the preformed address information and unreproducible preformed information is recorded in advance; a first recording area, which is adjacent to said second pre-recording area and in which first record information is recorded and which is reproduced by an information reproducing apparatus in reproduction, the first record information including physical address information which can be reproduced by said information reproducing apparatus; and a second recording area, which is adjacent to said first recording area and in which predetermined second record information is recorded,
said information reproducing apparatus comprising:
a first reproducing device for reproducing the first record information recorded in said first recording area; and
a second reproducing device for reproducing the second record information recorded in said second recording area, with reference to the physical address information included in the first record information reproduced by said first reproducing device.

10. An information reproducing method of performing reproduction on an information recording medium comprising: a first pre-recording area, in which reproducible preformed information including physical address information is recorded in advance and in which preformed address information assigned in advance is not recorded; a second pre-recording area, which is adjacent to said first pre-recording area and in which each of the preformed address information and unreproducible preformed information is recorded in advance; a first recording area, which is adjacent to said second pre-recording area and in which first record information is recorded and which is reproduced by an information reproducing apparatus in reproduction, the first record information including physical address information which can be reproduced by said information reproducing apparatus; and a second recording area, which is adjacent to said first recording area and in which predetermined second record information is recorded,
said information reproducing method comprising:
a first reproducing process of reproducing the first record information recorded in said first recording area; and
a second reproducing process of reproducing the second record information recorded in said second recording area, with reference to the physical address information included in the first record information reproduced by said first reproducing process.

11. A recording medium recording thereon a computer program for controlling a computer provided for an information recording apparatus for recording first record information and second record information onto an information recording medium comprising: a first pre-recording area, in which reproducible preformed information including physical address information is recorded in advance and in which preformed address information assigned in advance is not recorded; a second pre-recording area, which is adjacent to said first pre-recording area and in which each of the preformed address information and unreproducible preformed information is recorded in advance; a first recording area, which is adjacent to said second pre-recording area and in which the first record information is recorded and which is reproduced by an information reproducing apparatus in reproduction, the first record information including physical address information which can be reproduced by said information reproducing apparatus; and a second recording area, which is adjacent to said first recording area and in which the predetermined second record information is recorded, said information recording apparatus comprising: a first recording device for recording the first record information including the physical address information into said first recording area, with reference to the preformed address information recorded in advance in said second pre-recording area; and a second recording device for recording the second record information into said second recording area, said computer program making the computer function as said first recording device and said second recording device.

12. A recording medium recording thereon a computer program for controlling a computer provided for an information reproducing apparatus for performing reproduction on an information recording medium comprising: a first pre-recording area, in which reproducible preformed information including physical address information is recorded in advance and in which preformed address information assigned in advance is not recorded; a second pre-recording area, which is adjacent to said first pre-recording area and in which each of the preformed address information and unreproducible preformed information is recorded in advance; a first recording area, which is adjacent to said second pre-recording area and in which first record information is recorded and which is reproduced by an information reproducing apparatus in reproduction, the first record information including physical address information which can be reproduced by said information reproducing apparatus; and a second recording area, which is adjacent to said first recording area and in which predetermined second record information is recorded, said information reproducing apparatus comprising: a first reproducing device for reproducing the first record information recorded in said first recording area; and a second reproducing device for reproducing the second record information recorded in said second recording area, with reference to the physical address information included in the first record information reproduced by said first reproducing device, said computer program making the computer function as said first reproducing device and said second reproducing device.

* * * * *